(12) United States Patent  
Gochenour

(10) Patent No.: US 6,633,806 B2
(45) Date of Patent: Oct. 14, 2003

(54) CONTROL FOR TRANSMISSION SYSTEM UTILIZING A CENTRIFUGAL CLUTCH

(75) Inventor: Daniel V. Gochenour, Auburn, IN (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/943,042

(22) Filed: Aug. 30, 2001

(65) Prior Publication Data

US 2003/0045987 A1 Mar. 6, 2003

(51) Int. Cl.[7] .................................................. G06F 7/00
(52) U.S. Cl. .......................... 701/51; 701/67; 477/5; 477/74; 192/53.2
(58) Field of Search .............................. 701/51, 68, 67; 477/5, 73, 74, 186; 192/53.2

(56) References Cited

U.S. PATENT DOCUMENTS

| | | | |
|---|---|---|---|
| 3,580,372 A | 5/1971 | Schiefer et al. | 192/105 |
| 3,696,901 A | 10/1972 | Henry | 192/105 BA |
| 3,810,533 A | 5/1974 | Densow | 192/105 BA |
| 4,081,065 A | 3/1978 | Smyth et al. | 192/0.076 |
| 4,361,060 A | 11/1982 | Smyth | 74/866 |
| 4,361,065 A | 11/1982 | Wilcox et al. | 84/1.03 |
| 4,576,263 A | 3/1986 | Lane et al. | 192/0.044 |
| 4,593,580 A | 6/1986 | Schulze | 74/858 |
| 4,595,986 A | 6/1986 | Daubenspeck et al. | 364/424.1 |
| 4,610,343 A | 9/1986 | Hikari | 192/105 BA |
| 4,646,891 A | 3/1987 | Braun | 192/0.032 |
| 4,754,665 A | 7/1988 | Vandervoort | 74/745 |
| 4,819,779 A | 4/1989 | Nickel et al. | 192/105 BA |
| 4,838,397 A * | 6/1989 | Kurihara et al. | 477/73 |
| 4,936,428 A | 6/1990 | Leigh-Monstevens et al. | 192/0.02 R |
| 5,176,234 A * | 1/1993 | Reik et al. | 192/53.2 |
| 5,272,630 A * | 12/1993 | Brown et al. | 701/68 |
| 5,335,566 A | 8/1994 | Genise et al. | 477/124 |
| 5,370,013 A | 12/1994 | Reynolds et al. | 74/330 |
| 5,437,356 A | 8/1995 | Lohr | 192/105 BA |
| 5,439,428 A | 8/1995 | Slicker | 477/175 |
| 5,441,137 A | 8/1995 | Organek et al. | 192/35 |
| 5,490,063 A | 2/1996 | Genise | 364/424.1 |
| 5,509,867 A | 4/1996 | Genise | 477/120 |
| 5,620,392 A | 4/1997 | Genise | 477/120 |
| 5,630,773 A | 5/1997 | Slicker et al. | 477/176 |
| 5,634,867 A | 6/1997 | Mack | 477/86 |
| 5,730,269 A | 3/1998 | Hersey | 192/105 BA |
| 5,960,916 A | 10/1999 | Organek et al. | 192/35 |
| 5,974,354 A | 10/1999 | Janecke et al. | 701/64 |
| 5,974,906 A | 11/1999 | Stine et al. | 74/335 |
| 6,015,366 A | 1/2000 | Markyvech et al. | 477/109 |
| 6,022,295 A | 2/2000 | Liu | 477/180 |

* cited by examiner

Primary Examiner—Gertrude Arthur
(74) Attorney, Agent, or Firm—Rader, Fishman & Grauer PLLC

(57) ABSTRACT

A control system/method for controlling a vehicle drivetrain system including an internal combustion engine, a transmission and a centrifugal clutch for drivingly coupling an engine output to a transmission input shaft. A system controller issues command output signals for controlling engine speed in order to prevent damage and/or overheating of the clutch during periods of prolonged operation of the clutch in a partially engaged state.

33 Claims, 7 Drawing Sheets

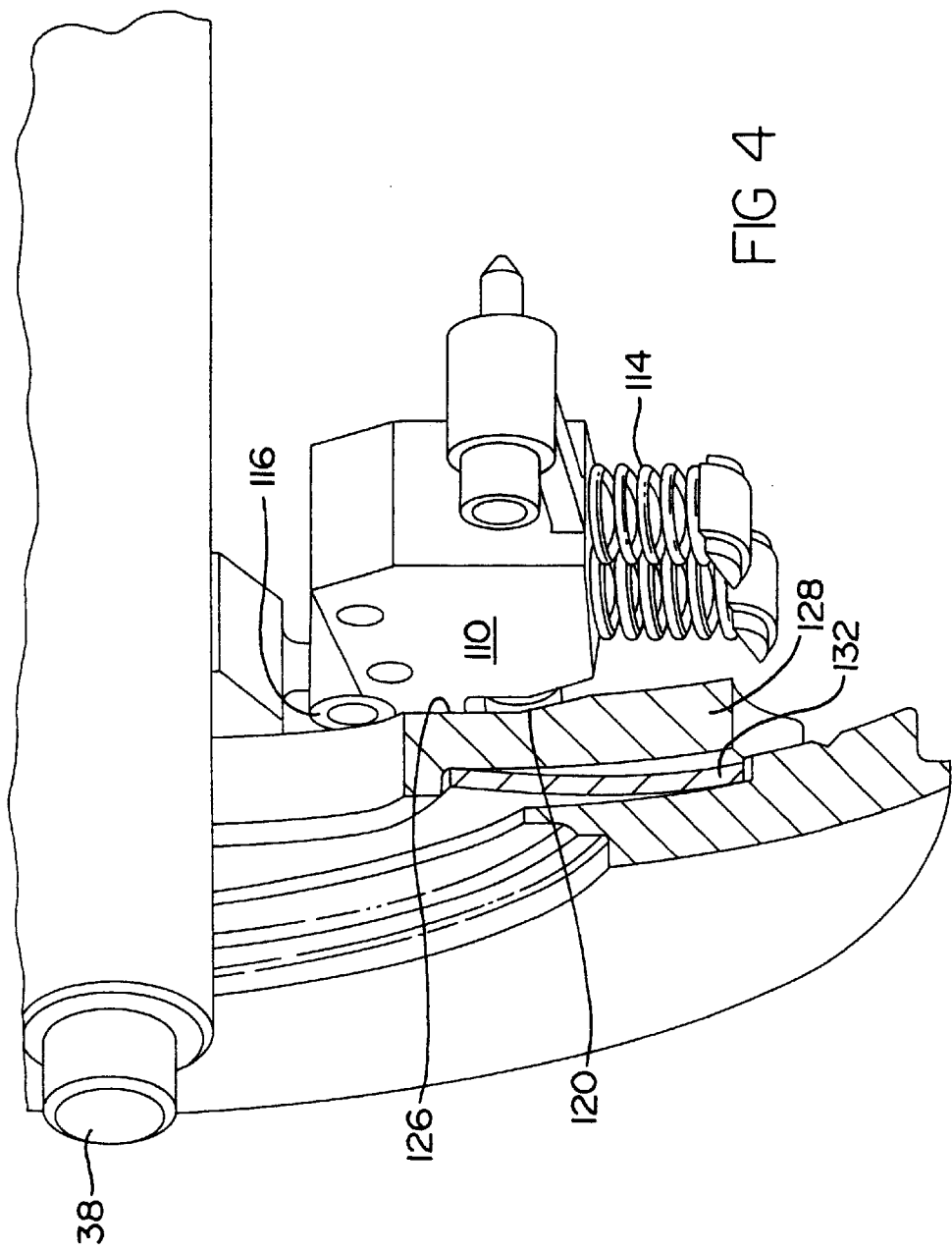

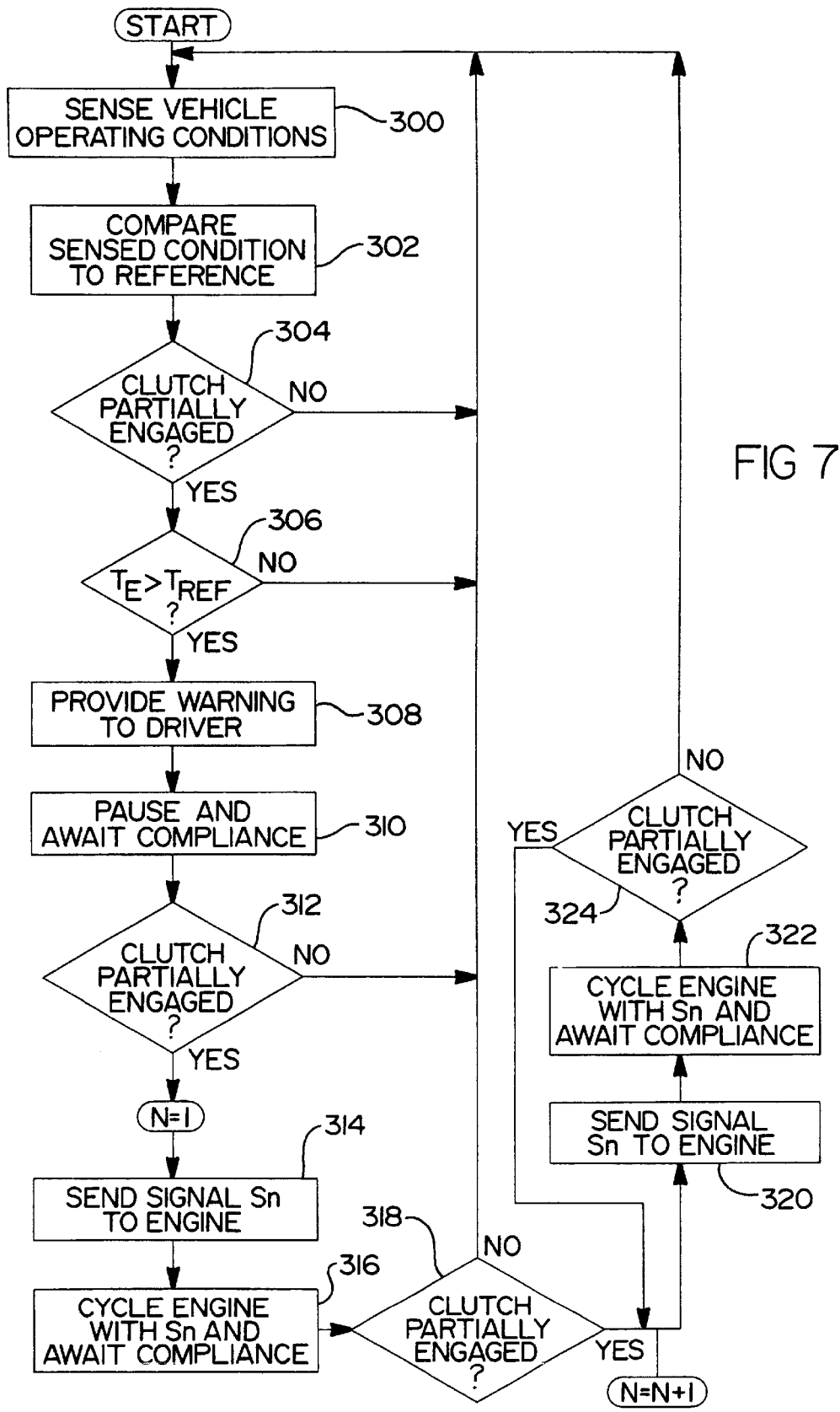

CONTROL FOR TRANSMISSION SYSTEM UTILIZING A CENTRIFUGAL CLUTCH

FIELD OF THE INVENTION

The present invention relates generally to a vehicular transmission system utilizing a centrifugal master friction clutch. In particular, the present invention relates to an automated vehicular transmission system comprising an engine, a multiple ratio transmission, a centrifugally operated master friction clutch for drivingly coupling the engine to a transmission and a control unit for controlling fueling of the engine during prolonged operation of the centrifugal clutch in a partially engaged condition.

BACKGROUND OF THE INVENTION

Automated mechanical transmission systems not requiring the vehicle driver or operator to operate the vehicle master clutch (so called "two-pedal systems") are known in the prior art, as may be seen by reference to U.S. Pat. Nos. 4,081,065; 4,361,060, 4,936,428; 5,439,428; 5,634,867; 5,630,773; 5,960,916; and 5,947,847, the disclosures of which are incorporated herein by reference in their entirety. These systems are not totally satisfactory as separate clutch actuators, sensors and/or, electrical and/or fluid power (i.e., compressed air and/or hydraulic) connections thereto are required which adds to the expense of assembling and maintaining such systems.

Centrifugally operated friction clutches are well known in the prior art and typically include an input member driven by a primer mover, usually an electric motor or internal combustion engine, and weights pivotable or rotatable with respect to the driving member which, upon rotation of the input member, will move radially outwardly under the effect of centrifugal force to cause the input member to frictionally engage an output member. Examples of centrifugally operated clutches may be seen by reference to U.S. Pat. Nos. 3,580,372; 3,580,372; 3,696,901; 5,437,356; 3,810,533; 4,819,779; 5,441,137; 5,730,269; and 4,610,343, the disclosures of which are incorporated herein by reference in their entirety.

Vehicular transmission systems, especially for heavy-duty vehicles, utilizing centrifugal clutches permit a driver to hold the vehicle on a grade or encourage the vehicle to "creep" by increasing the speed of the engine to a point sufficient to partially engage the clutch. A drawback of this approach is that partially engaging the clutch for an extended period of time expedites wear of the friction materials and causes the clutch to develop a large amount of heat, both of which contribute to a reduction in the operative life of the clutch.

A vehicular transmission system utilizing a centrifugal master clutch is disclosed in a pending U.S. patent application Ser. No. 09/814,494, filed Mar. 21, 2001, which is owned by the assignee of the present invention and is hereby incorporated by reference in its entirety. This reference discloses a control system and method of providing damage and/or overheating protection for a centrifugal clutch. Upon sensing a potential overheating problem, the control system reacts by increasing or decreasing the speed of the engine. If the engine speed is increased, the clutch will fully engage causing the driver to use a different method of maintaining the vehicle position. If the engine speed is decreased, the clutch will disengage requiring the driver to increase the throttle position to engage the clutch. While this method has proven to be effective in preventing damage and/or overheating of the clutch, the automatic engagement or disengagement of the clutch is undesirable for a driver.

SUMMARY OF THE INVENTION

In accordance with an embodiment of the present invention, a control system and method of controlling a vehicular automated transmission system utilizing a centrifugal master friction clutch is provided. The inventive control system and method utilizes closed loop control to provide the clutch with protection from damage and/or overheating due to the clutch being operated in a partially engaged state.

In a preferred embodiment, a vehicular automated transmission system is provided that includes an internal combustion engine having a flywheel, a multiple speed transmission having an input shaft and a centrifugal friction clutch drivingly connecting the engine flywheel to the input shaft. An engine controller having at least one mode of operation is utilized for controlling engine fueling to control at least the engine speed. The transmission system further includes a control unit for receiving input signals indicative of various vehicle operating conditions and processing the signals according to logic rules to issue command output signals to system actuators including at least the engine controller.

The inventive control method comprises the step of first sensing vehicle operating conditions, such as, for example, vehicle acceleration or clutch temperature. Second, the control unit determines whether the clutch is being operated in a partially engaged state by comparing the sensed operating condition(s) to a predetermined reference value. Third, if it is determined that the clutch is being operated in the partially engaged state, the control unit issues an output signal to the engine controller commanding that the engine speed be repetitively increased and then decreased a predetermined amount. The increase and decrease of the engine speed causes the clutch to further engage and then disengage. The repetitive partial engagement and disengagement of clutch will not cause the vehicle to move, but will cause the vehicle to slightly shake warning the driver that clutch is being operated in a partially engaged state.

Among other advantages, the inventive control system and method of controlling operation of a vehicular transmission system discourages the driver of a vehicle employing a centrifugal master friction clutch from operating the clutch in a partially engaged state for a prolonged period of time. Moreover, the inventive control system and method prevents the clutch from being automatically engaged or disengaged too quickly in the event the clutch is being operated in a partially engaged state.

Various additional aspects and advantages of this invention will become apparent to those skilled in the art from the following detailed description of the preferred embodiment, when read in light of the accompanying drawings.

BRIEF DESCRIPTION OF THE DRAWINGS

The features and inventive aspects of the present invention will become more apparent upon reading the following detailed description, claims, and drawings, of which the following is a brief description:

FIG. 4 is a partial sectional view of the roller, ramp, and clamp force limiting spring mechanism utilized with the centrifugal mechanism.

FIG. 7 is a schematic illustration, in flowchart format, of the control logic of the present invention.

DESCRIPTION OF THE PREFERRED EMBODIMENT

Figure 1:
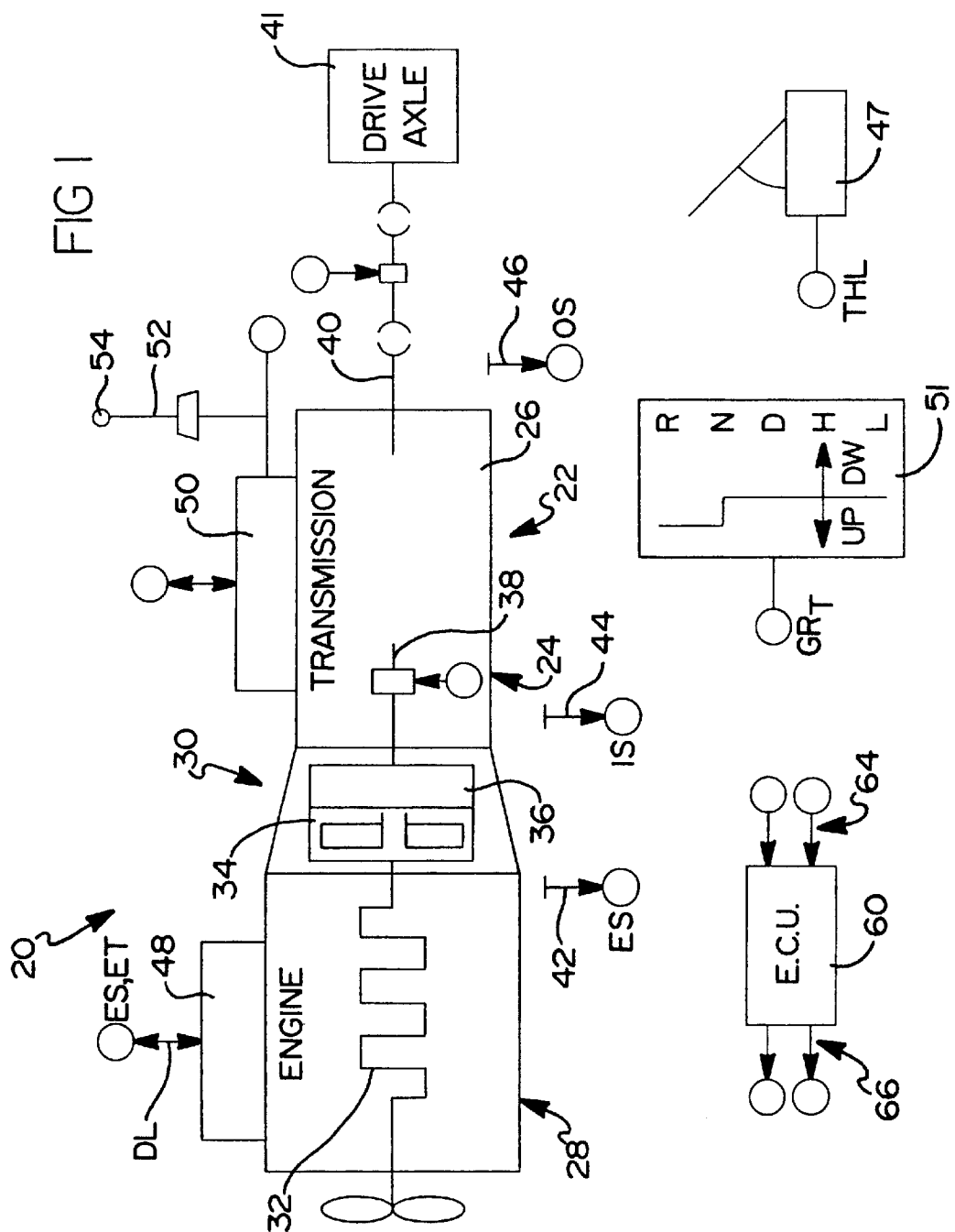
FIG. 1 is a schematic illustration of a vehicular drive-train system using the centrifugal clutch and engine fuel control of the present invention.

Referring now to the drawings, the preferred embodiments of the present invention are described in detail. An at least partially automated vehicle drive-train system 20 utilizing the centrifugally operated master friction clutch of the present invention is schematically illustrated in FIG. 1. System 20 may be fully automated, as seen by way of example in U.S. Pat. No. 4,361,060, partially automated, as seen by way of example in U.S. Pat. Nos. 4,648,290 and 5,409,432, or manual with controller assist, as seen by way of example in U.S. Pat. Nos. 4,850,236; 5,582,558; 5,735,771; and 6,015,366.

In system 20, a multi-gear transmission 22 comprising a main transmission section 24, that may or may not be connected in series with a splitter-type auxiliary transmission section 26, is drivingly connected to an internal combustion engine 28, such as a gasoline or diesel engine, by a centrifugal master friction clutch 30 of the present invention. Transmission 22, by way of example, may be of the type well known in the prior art and sold by the assignee of this application, EATON CORPORATION, under the trademarks "Super-10" and "Lightning", and may be seen in greater detail by reference to U.S. Pat. Nos. 4,754,665; 6,015,366; 5,370,013; 5,974,906; and 5,974,354, the disclosures of which are incorporated herein by reference in their entirety.

Engine 28 includes a crankshaft 32, which is attached to an input member 34 of centrifugal master friction clutch 30. Input member 34 frictionally engages with, and disengages from, an output member 36, which is attached to an input shaft 38 of transmission 22. A transmission output shaft 40 extends from transmission 22 for driving connection to the vehicle drive wheels through a drive axle 41 or transfer case.

The terms "engaged" and "disengaged" as used in connection with a master friction clutch refer to the capacity, or lack of capacity, respectively, of the clutch to transfer a significant amount of torque. Mere random contact of the friction surfaces, in the absence of at least a minimal clamping force, is not considered engagement.

As may be seen from FIG. 1, centrifugal clutch 30 requires no external clutch actuator and is operated as a function of the rotational speed (ES) of the engine. Centrifugal clutch 30 also requires no connections to operating linkages, command signal inputs, power electronics and/or fluid power conduits. While the most economical application of the present invention is with a dry friction clutch, the present invention is also compatible with wet clutch technology.

Vehicle drive-train system 20 further includes rotational speed sensors 42 for sensing engine rotational speed (ES), 44 for sensing input shaft rotational speed (IS), and 46 for sensing output shaft rotational speed (OS), and providing signals indicative thereof. A sensor 47 provides a signal THL indicative of throttle pedal position or of torque demand. The signal is usually a percentage (0% to 100%) of full throttle position. Engine 28 may be electronically controlled, including an electronic controller 48 communicating over an electronic data link (DL) operating under an industry standard protocol such as SAE J-1922, SAE J-1939, ISO 11898 or the like.

An X-Y shift actuator 50, which by way of example may be of the types illustrated in U.S. Pat. Nos. 5,481,170; 5,281,902; 4,899,609; and 4,821,590, may be provided for automated or shift-by-wire shifting of the transmission main section and/or auxiliary section. A shift selector 51 allows the vehicle driver to select a mode of operation and provides a signal $GR_T$ indicative thereof. Alternately, a manually operated shift lever 52 having a shift knob 54 thereon may be provided. As is well known, shift lever 52 is manually manipulated in a known shift pattern for selective engagement and disengagement of various shift ratios. Shift knob 54 may be of the type described in aforementioned U.S. Pat. No. 5,957,001. Shift Knob 54 may include an intent to shift switch (not illustrated) by which the vehicle operator will request automatic engine fueling control to relieve torque lock and allow a shift to transmission neutral.

System 20 further includes an electronic control unit 60 ("ECU"), preferably a microprocessor-based control unit of the type illustrated in U.S. Pat. Nos. 4,595,986; 4,361,065; and 5,335,566, the disclosures of which are incorporated herein by reference in their entirety. The ECU 60 receives input signals 64 and processes the same according to predetermined logic rules to issue command output signals 66 to system actuators, such as engine controller 48, shift actuator 50, and the like.

As is known, to disengage a jaw clutch in a vehicular mechanical transmission, especially in a heavy-duty vehicle, it is necessary to relieve torque lock at the engaged jaw clutch. If opening the master friction clutch 30 is not desirable, torque lock can be relieved by fueling the engine to cause assumed zero drive-line torque and/or by forcing torque reversals, which will positively cause crossings of zero drive-line torque.

Fully or partially automated mechanical transmission systems that, upon determining that a shift from a currently engaged ratio into neutral and then into a target ratio is desirable, will, while maintaining the vehicle master friction clutch engaged, initiate automatic fuel control to cause reduced torque across the jaw clutches to be disengaged, are also known in the prior art as may be seen by reference to above-mentioned U.S. Pat. Nos. 4,850,236; 5,582,558; 5,735,771; 5,775,639; 6,015,366; and 6,126,570. Shifting with the master clutch remaining engaged is preferred by many situations, as such shifts tend to be of a higher shift quality and/or cause less wear on the drive-line. These systems include systems that attempt to fuel the engine to achieve and maintain a zero drive-line torque, see U.S. Pat. No. 4,593,580, the disclosure of which is incorporated herein by reference in its entirety, and systems that fuel the engine to force one or more torque reversals, see U.S. Pat. No. 4,850,236. Upon sensing a transmission neutral condition, the clutch is maintained engaged and the engine speed commanded to a substantially synchronous speed for engaging a target gear ratio ($ES=OS \times GR_T$).

Control of engine torque to achieve a desired output or flywheel torque is known as and may be seen by reference U.S. Pat. No. 5,620,392, the disclosure of which is incorporated herein by reference in its entirety. Engine torque as used herein refers to a value indicative of an engine torque, usually gross engine torque, from which an output or flywheel torque may be calculated or estimated. The relationship of gross engine torque to flywheel torque is discussed in U.S. Pat. Nos. 5,509,867 and 5,490,063, the disclosures of which are incorporated herein by reference in their entirety.

One or more engine torque's or torque limit values may be commanded on, or read from, an industry standard data link, DL, such as an SAE J-1922, SAE J-1939 or ISO11898 compliant datalink. By way of example, datalinks complying with SAE J1939 or similar protocol, allow the ECU 60 to issue commands over the datalink for the engine to be fueled in any one of several modes, such as (i) in accordance with the operators setting of the throttle, (ii) to achieve a commanded or target engine speed ($ES=ES_T$), (iii) to achieve a commanded or target engine torque ($ET=ET_T$) and (iv) to maintain engine speed and engine torque below limits ($ES<ES_{MAX}$ and $ET<ET_{MAX}$). Many input/informational signals, such as engine speed (ES), engine torque (ET), and the like may also be carried by a datalink.

A more detailed view of the structure of centrifugal clutch 30 may be seen by reference to FIGS. 3–6. As is known, rotation of input portion 34 will cause clutch 30 to engage and drivingly connect an engine output member, usually an engine flywheel or the like, to transmission input shaft 38. The clamping force (CF) and torque transfer capacity of clutch 30 is a function of the rotational speed (ES) of engine 28 and clutch input member 34. Clutch 30 reaches incipient engagement at an engine speed (ES) greater than engine idle and fully engages at an engine speed lower than the engine speed at which a first upshift is required. Unlike normally closed master friction clutches that are normally engaged, clutch 20 is disengaged at lower engine speeds.

To allow proper vehicle launch and dynamic shifting with the master clutch engaged, clutch 30 once fully engaged, should remain fully engaged at engine speeds greater than (i) the highest expected speed at which downshifts are initiated and (ii) the minimum expected engine speed after an upshift. Incipient engagement is the initial torque transfer contact of clutch friction surfaces as may be seen by reference to U.S. Pat. Nos. 4,646,891 and 6,022,295, the disclosures of which are incorporated herein by reference in their entirety.

Figure 3:
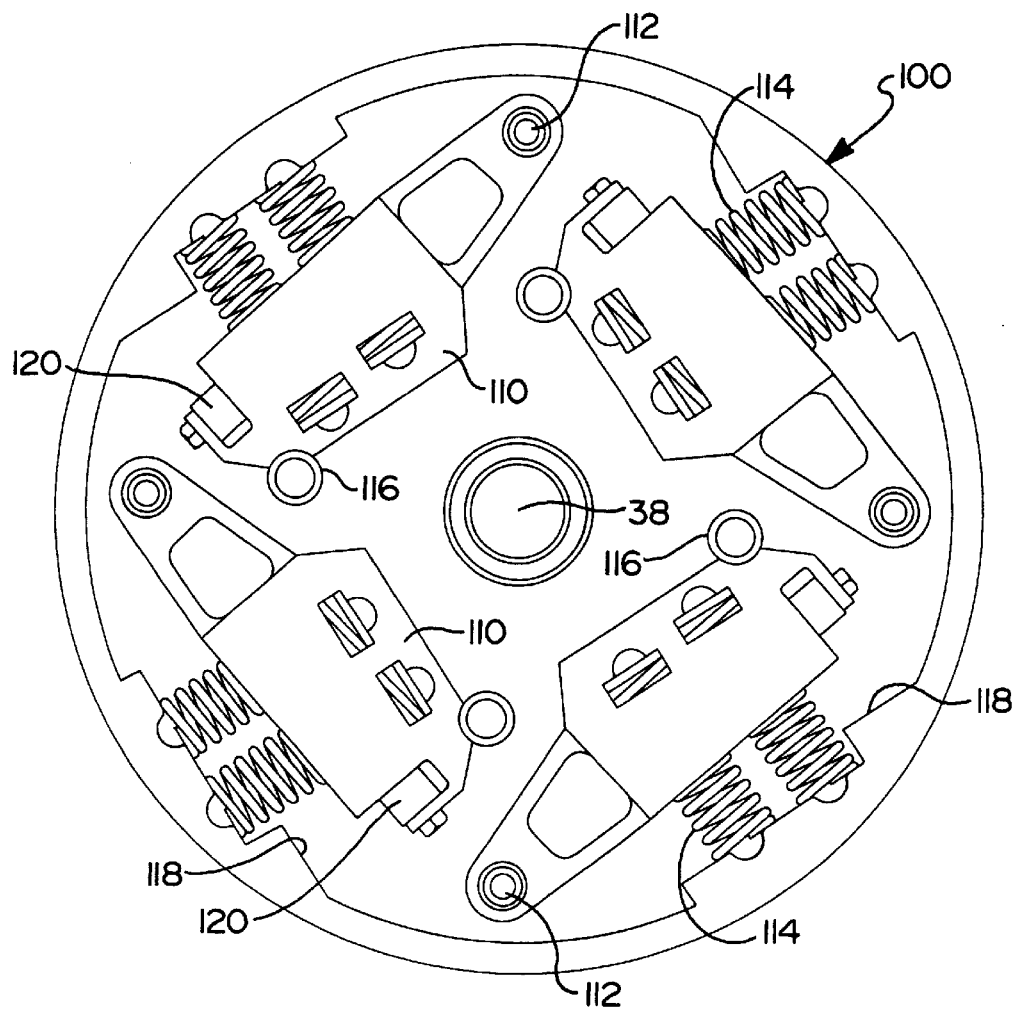
FIG. 3 is a partial top view, in section, of the cover and centrifugal mechanism of the clutch of the present invention.
Figure 5A:
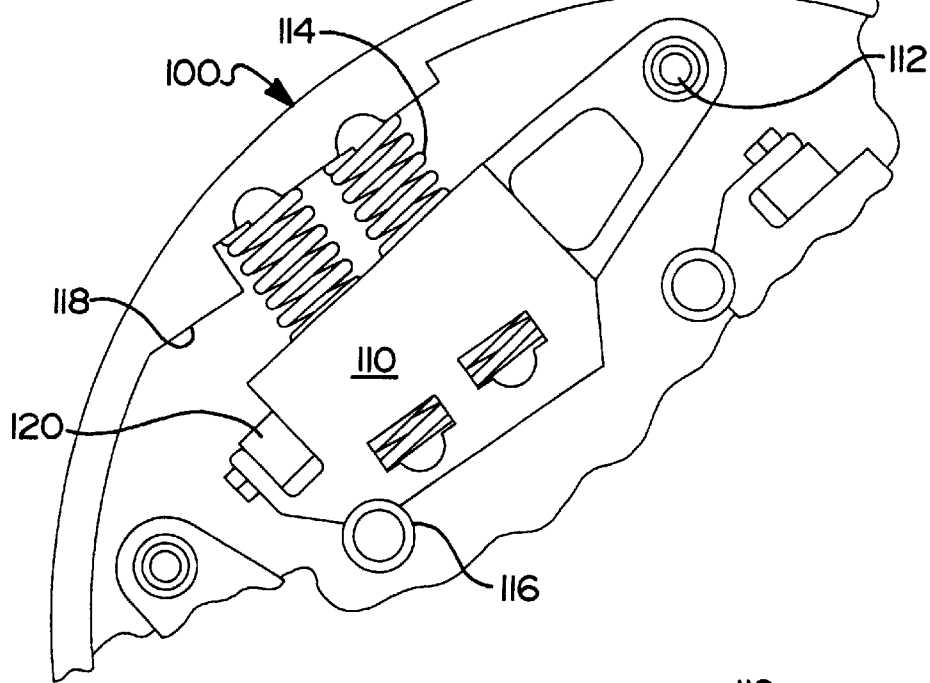
FIGS. 5A and 5B are partial sectional views illustrating the position of the flyweights in the fully radially inward clutch disengaged position and the fully radially outward clutch fully engaged position, respectively.
Figure 5B:
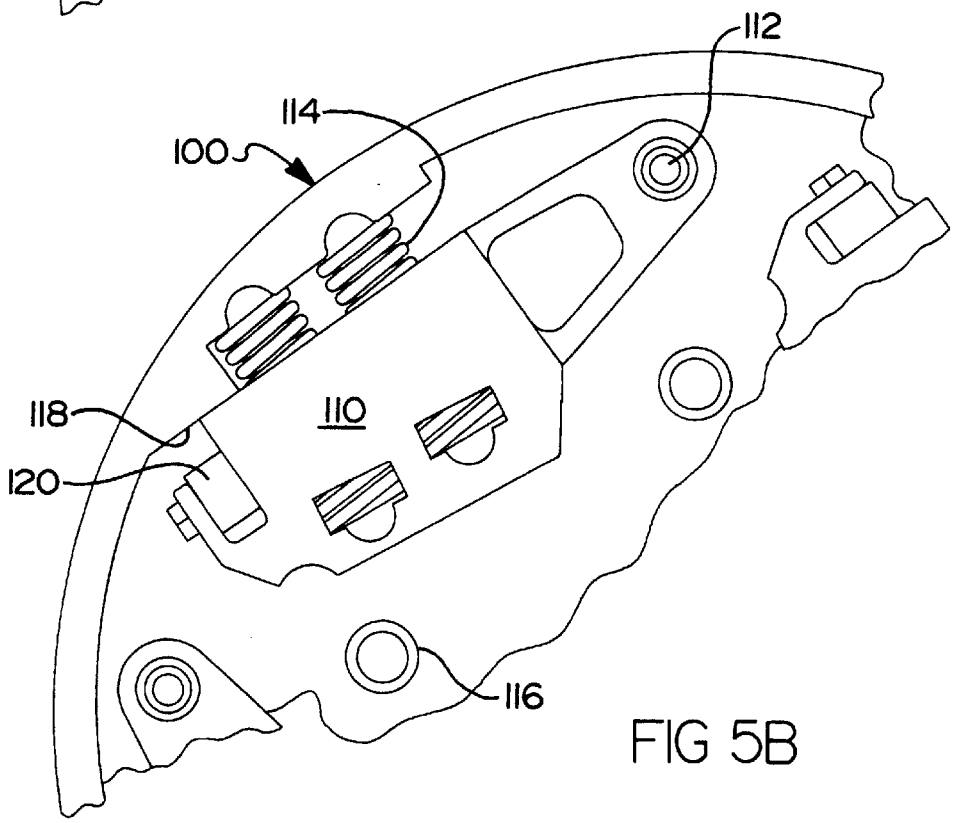
Figure 6:
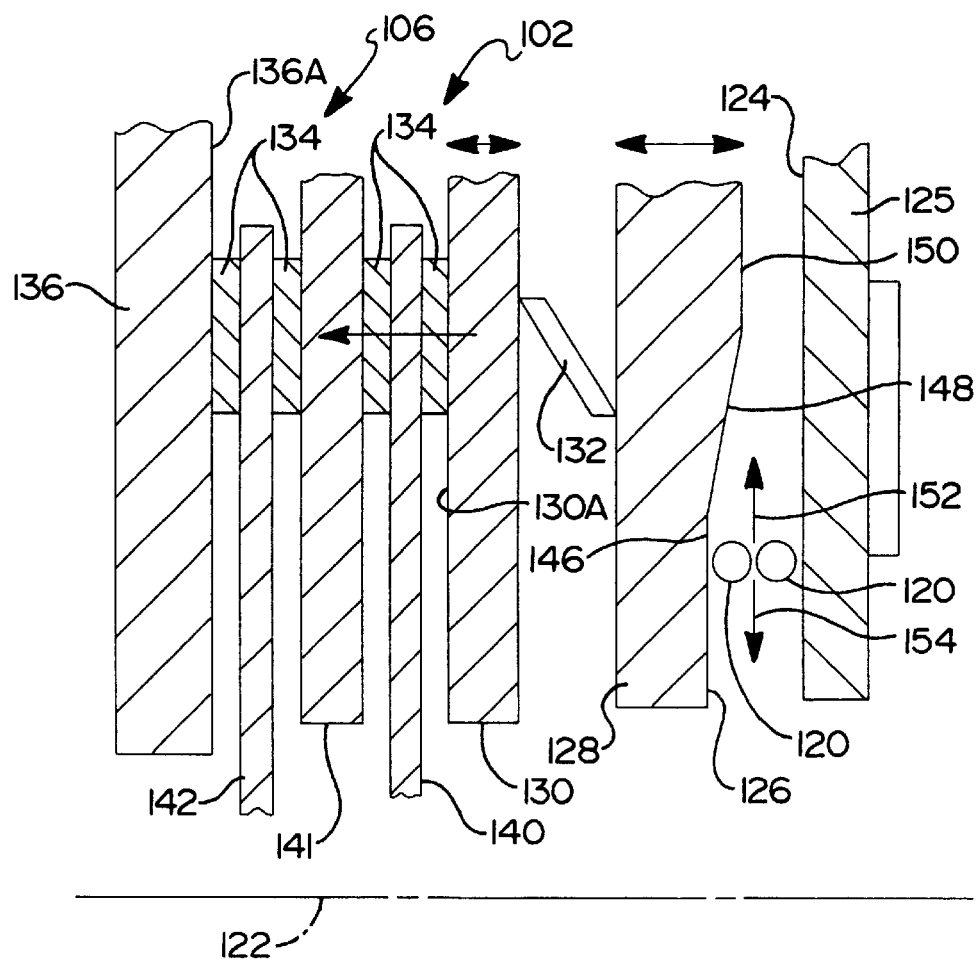
FIG. 6 is a schematic partial sectional view of the present invention.

Referring to FIGS. 3 and 6 of the drawings, clutch 30 includes a clutch cover assembly 100, a first friction plate 102, an intermediate pressure plate 141, and a second friction plate 106. Cover assembly 100 and intermediate pressure plate 141 are mounted to the engine flywheel 136 via a mounting bracket (not illustrated) for rotation therewith and comprise the input portion 34 of clutch 30. Friction plates 102 and 106 are typically splined to transmission input shaft 38 and comprise the output portion 36 of clutch 30.

Referring to FIGS. 3–5B, cover assembly 100 includes four flyweights 110 that are pivotably mounted to cover assembly 100 at pivot pins 112. A plurality of return springs 114 bias the flyweights 110 radially inwardly to rest on stops 116 (see FIG. 5A). A surface 118 of cover assembly 100 limits the radially outward movement of flyweights 110 (see FIG. 5B). As engine 28 and cover assembly 100 rotate, the effect of centrifugal force will cause the flyweights 110 to move against the biasing force of springs 114 from the position of FIG. 5A to the position of FIG. 5B. Flyweights 110 each carry one or more rollers 120 or functionally similar wedging member, which act between a reaction surface and a ramp to provide an axial clamping force for engaging the master friction clutch 30.

FIG. 6 is a schematic illustration of the operational members shown in fragments as rotating about a rotational axis 122 of transmission input shaft 38. Rollers 120 of flyweights 110 are received between a substantially flat surface 124 of a fixed reaction plate 125 and a ramped surface 126 of an axially moveable ramp plate 128. The ramp plate 128 acts on an axially movable main pressure plate 130 through a preloaded spring member 132, such as a diaphragm spring, which limits the axial force applied to pressure plate 130 by ramp plate 128. Main pressure plate 130 will apply a clamping force (CF) on the friction pads 134 of friction plates 102, 106 which are trapped between surface 130A of the main pressure plate 130 and the intermediate pressure plate 141 and surface 136A of the engine flywheel 136. The hub portions 140 and 142 of the friction plates 102 and 106, respectively, are adapted to be splined to input shaft 38 for rotation therewith while plates 125, 128, 130, and 141 rotate with the engine flywheel 136.

Figure 2:
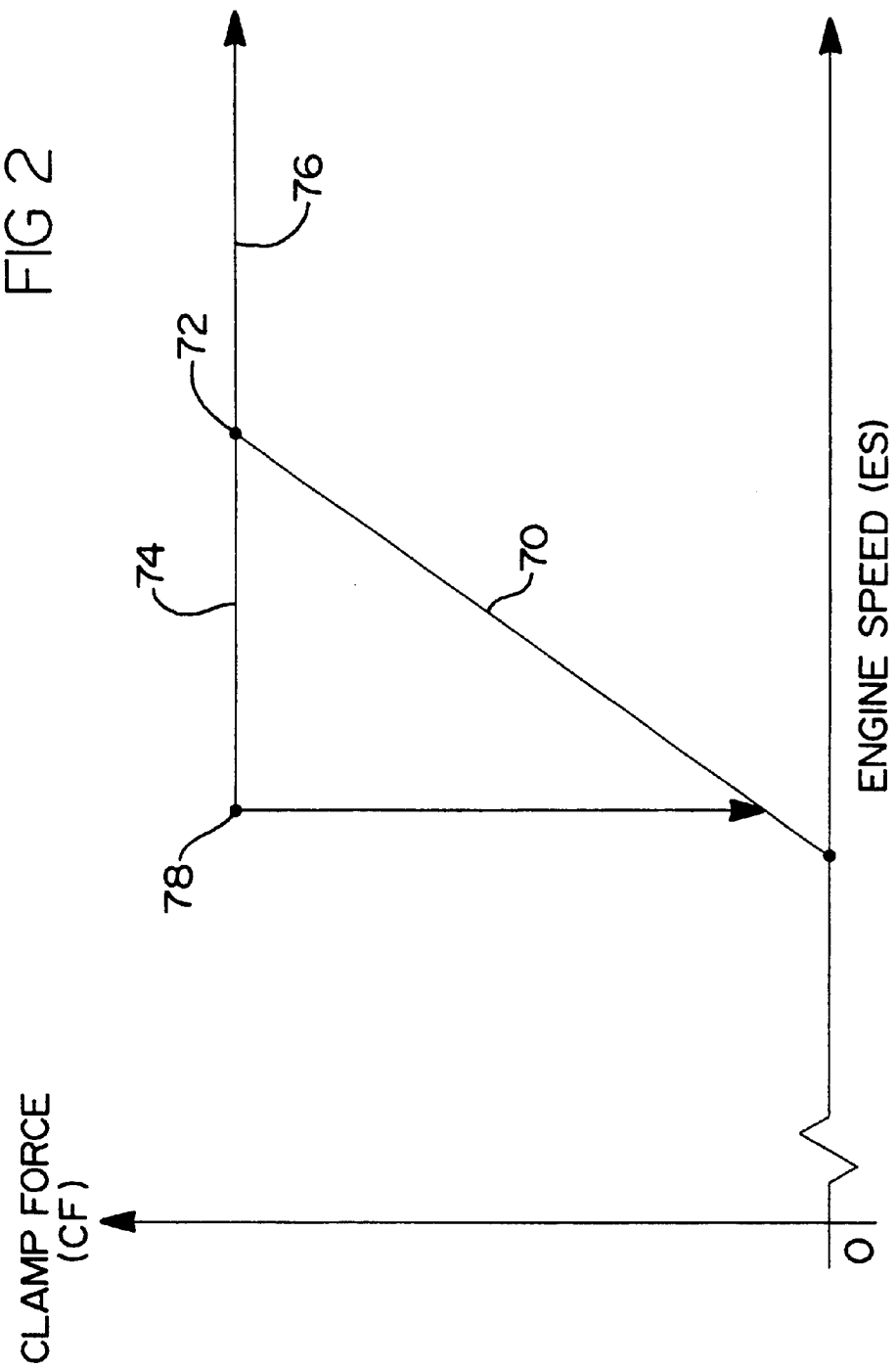
FIG. 2 is a schematic illustration, in graphical format, of the clamp force characteristics of the centrifugal clutch of the present invention at various engine speeds.

At rest, one of rollers 120 will engage the recessed portion 146 of surface 126 and will not apply a leftward acting axial clamping force (CF) to friction pads 134. As the roller 120 travels sufficiently radially outwardly and onto the ramped portion 148 of ramp surface 126, an increasing axial clamping force is applied (see line 70 of FIG. 2). As the roller moves further radially outwardly onto the flat extended portion 150 of ramp surface 126, the clamp force (CF) will remain at a capped value (see lines 74 and 76 of FIG. 2) as limited by spring member 132. Applying force through a spring to limit the maximum force applied is known in the prior art as may be seen by reference to U.S. Pat. No. 5,901,823.

A greater centrifugal force 152 is required to move rollers 120 up ramp portion 148 to flat portion 150 than is required to retain the rollers on flat portion 150 against the effect of a radially inward directed spring force 154 generated by return springs 114. This accounts for the difference between the engine speed (ES) value at the initial maximum clamp force, point 72 of FIG. 2, and the release engine speed value, point 78 of FIG. 2. The relative masses of flyweights 110 and/or the spring rate of spring 114 may be modified to change the engine speed value at disengagement (point 78 of FIG. 2).

As is known, to launch a heavy duty vehicle, less torque at the input shaft is required (for example, 600 to 900 lb.ft., depending on the grade) than to move the vehicle at high speeds. Typical heavy-duty vehicle diesel engines will have a maximum torque output of about 1400 to 2200 lb.ft. at a maximum torque RPM. For one embodiment of master friction clutch 30, 1000 lbs. of clamp force will provide a torque capacity of about 600 to 700 lb.ft., while 4000 lbs. of clamp force will provide a torque capacity of 3000 lb.ft., which is well in excess of engine torque capacity and drive-line capacity and provides a large margin of safety when clutch 30 is in the capped clamp load condition (lines 74 and 76 of FIG. 2).

At vehicle launch, i.e. starting the vehicle from stop, the clutch 30 should lock up at between about 750 RPM and 950 RPM, depending on whether the vehicle is starting on a steep grade or is in another high resistance condition. In the launch mode, the transition from disengagement to engagement of the centrifugal master clutch 30 is dependent upon increasing engine speed. One characteristic of a centrifugal clutch is that a driver of a vehicle is able to maintain the vehicle in a stopped position on a steep grade by operating the clutch in a partially engaged state known as "slipping" the clutch. A drawback to this approach is that prolonged "slipping" of the clutch develops a large amount of heat and the friction material is degraded, thereby reducing the life of the clutch. The control system and method of controlling a centrifugal master friction clutch according to the present invention is designed to discourage a driver from operating the clutch in a partially engaged state for a prolonged period of time.

The control system comprises engine controller 48 and ECU 60, which together function as a signaling device for commanding operation of engine 28. The Engine controller 48 includes an output for selectively transmitting a command signal to engine 28 and engine 28 includes an input that selectively receives the command signal from engine controller 48. Engine controller 48 further includes at least one mode of operation for controlling engine fueling to control at least the engine speed (ES).

ECU 60 includes at least one input for receiving input signals and processing the signals according to logic rules to issue command output signals 66 to engine controller 48 when ECU 60 determines that clutch 30 is being operated in a partially engaged state for an excessive period of time. The command output signals 66 instruct engine controller 48 to generate at least one engine input signal having a predetermined amplitude and frequency that causes the engine speed to repetitively increase and decrease.

Referring to FIG. 7 of the drawings, the control method of the present invention will be described in detail. As shown in step 300, ECU 60 first senses at least one vehicle operating condition to determine whether clutch 30 is being operated in a partially engaged state. Constant slipping of clutch 30 may be sensed in several ways, such as, for example, sensing if vehicle acceleration is less than a reference value ((dos/dt)<REF?), sensing a difference between engine speed (ES) and input shaft speed (IS), or by sensing or estimating a clutch temperature from sensed vehicle operating conditions, see U.S. Pat. No. 4,576,263, the disclosure of which is incorporated herein by reference in its entirety.

Another method of determining whether clutch 30 is being operated in a partially engaged state utilizes the sensed engine speed, input shaft or output shaft speed and net engine torque to calculate the energy the clutch is absorbing. This method subtracts energy dissipated (in the form of heat) from the energy input into the clutch to determine the clutch output energy at any given period of time.

ECU 60 compares the sensed operating condition(s) with a predetermined reference value of the sensed operating condition(s) to determine if clutch 30 is in a partially engaged state, as shown in steps 302 and 304. For example, clutch 30 may be deemed to be operating in a partially engaged state if the measured clutch temperature exceeds a predetermined reference temperature. In another example, clutch 30 may be deemed to be operating in a partially engaged state if the difference between the energy inputted into clutch 30 and the energy dissipated by clutch 30 is less than a predetermined reference value.

As shown in step 306, upon sensing operation of clutch 30 in a partially engaged state for a time period $(T_E)$ that exceeds a predetermined acceptable period of time $(T_{REF})$, such as, for example, five seconds, the ECU 60 warns the driver of excessive clutch slip, step 308. In a preferred embodiment, the warning is provided in the form of at least one of an audible tone or a flashing light within the drivers range of vision, such as, for example, in the vehicle instrument panel. However, the form of the warning is not critical to the operation of the inventive control system permitting other warnings, such as a textual message on LCD display in the vehicle cabin, to fall within the scope of this invention. As shown in step 310, the ECU 60 then pauses a predetermined period of time to allow the vehicle driver to comply with the warning before proceeding to the next step.

Referring to steps 312 and 314, continued, uninterrupted, operation of clutch 30 in a partially engaged state causes the ECU 60 to issue a command output signal 66 to engine controller 48 commanding the engine speed to repetitively increase and decrease, such as, for example, +/−10 RPM. In a preferred embodiment, engine controller 48 commands operation of engine 28 via a first engine input signal $S_n$ comprising a sine wave having a predetermined amplitude and frequency. The increase and decrease in the engine speed causes clutch 30 to further engage and then disengage. The repetitive partial engagement and disengagement of clutch 30 does not cause the vehicle to move, but instead causes the vehicle to slightly shake warning the driver that clutch 30 is being operated in a partially engaged state beyond an acceptable period of time.

Referring to steps 316–320, if after an additional predetermined period of time clutch 30 is still being operated in a partially engaged state, ECU 60 will issue a command output signal 66 to engine controller 48 requiring it to increase the amplitude and/or frequency of the first engine input signal $S_n$. Receipt of a second engine input signal $S_{n+1}$ causes the engine speed to repetitively increase and decrease at a substantially higher RPM than the first engine input signal $S_n$, such as, for example, +/−25 RPM. This larger swing in engine speed will cause the vehicle to shake more violently and may cause torque reversals in the drive-train. As shown in steps 322 and 324, the process of increasing the amplitude and/or frequency of the engine input signal $S_n$ is repeated until the driver ceases operation of clutch 30 in a partially engaged state.

The inventive control system and method of controlling operation of a vehicular transmission system advantageously discourages the driver of a vehicle employing a centrifugal clutch from operating the clutch in a partially engaged state for a prolonged period of time. Moreover, the inventive control system and method prevents the clutch from being automatically engaged or disengaged too quickly in the event the clutch is being operated in a partially engaged state.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A method for controlling a vehicular automated transmission system comprising an internal combustion engine having an engine flywheel, an engine controller having at least one mode of operation for controlling engine fueling to control at least the engine speed, a multiple speed transmission having an input shaft, a centrifugal friction clutch for drivingly connecting the engine flywheel to the input shaft, a throttle for requesting a degree of engine fueling, and a control unit for receiving input signals and processing the signals according to logic rules to issue command output signals to system actuators including at least the engine controller, the method comprising the steps of:

(a) sensing at least one vehicle operating condition;

(b) determining if the clutch is being operated in a partially engaged state; and (c) commanding the engine speed to repetitively increase and decrease a predetermined amount during operation of the clutch in a partially engaged state.

2. The control method according to claim 1, wherein the sensing step comprises sensing the vehicle acceleration.

3. The control method according to claim 2, wherein the step of determining if the clutch is being operated in a partially engaged state comprises comparing the vehicle acceleration to a reference vehicle acceleration.

4. The control method according to claim 1, wherein the sensing step comprises sensing the temperature of the clutch.

5. The control method according to claim 1 including the additional step of warning a driver if the clutch is operated in a partially engaged state beyond the predetermined period of time.

6. The control method according to claim 5, wherein the warning comprises generating at least one of an audible tone and a flashing light.

7. The control method according to claim 1, wherein the control unit transmits an input signal to the engine controller commanding the engine speed to repetitively increase and decrease.

8. The control method according to claim 7, wherein the engine controller transmits a command signal to the engine.

9. The control method according to claim 8, wherein the command signal is in the form of a sine wave having a predetermined amplitude and frequency.

10. The control method according to claim 9 including the additional step of increasing at least one of the amplitude and frequency of the command signal if after a predetermined amount of time the clutch continues to be operated in a partially engaged state.

11. The control method according to claim 1 wherein the commanding step is repeated until the clutch is fully engaged or disengaged.

12. A control system for controlling a vehicular automated transmission system comprising an internal combustion engine having an engine flywheel, an engine controller having at least one mode of operation for controlling engine fueling to control at least the engine speed, a multiple speed transmission having an input shaft, a centrifugal friction clutch for drivingly connecting the engine flywheel to the input shaft, a throttle for requesting a degree of engine fueling, and a control unit for receiving input signals and processing the signals according to logic rules to issue command output signals to system actuators including at least the engine controller, the control system characterized by the control unit having logic rules effective for:

(a) sensing at least one vehicle operating condition;

(b) determining if the clutch is being operated in a partially engaged state; and (c) commanding the engine speed to repetitively increase and decrease a predetermined amount during operation of the clutch in a partially engaged state.

13. The control system according to claim 12, wherein the logic rules are additionally effective for, upon determining that the clutch is being operated in a partially engaged state, allowing the clutch to operate in a partially engaged state for a predetermined period of time.

14. The control system according to claim 12, wherein the engine controller and control unit communicate over an electronic data link.

15. The control system according to claim 12, wherein the engine controller includes an output for selectively transmitting a command signal to the engine and the engine includes an input that selectively receives the command signal from the engine controller.

16. The control system according to claim 15, wherein, if the clutch is being operated in a partially engaged state in excess of a predetermined period of time, the command signal is in the form of a sine wave having a predetermined amplitude and frequency.

17. The control system according to claim 12, wherein the logic rules are additionally effective for increasing at least one of the amplitude and frequency of the command signal if after a predetermined amount of time the clutch continues to be operated in a partially engaged state.

18. The control system according to claim 12, further including a device for selectively informing a vehicle driver that the clutch is being operated in partially engaged state.

19. The control system according to claim 18, wherein the device generates an audible tone.

20. The control system according to claim 18, wherein the device is an indicator light.

21. A signaling device for controlling a vehicular automated transmission system comprising an internal combustion engine having an engine flywheel, a multiple speed transmission having an input shaft, a centrifugal friction clutch for drivingly connecting the engine flywheel to the input shaft, and a throttle for requesting a degree of engine fueling, the signaling device comprising:

an engine controller having at least one mode of operation for controlling engine fueling to control at least the engine speed; and a control unit having an input for receiving input signals and processing the signals according to logic rules to issue command output signals to system actuators including at least the engine controller, the command output signals instructing the engine controller to generate at least a first signal having a predetermined amplitude and frequency that causes the engine speed to repetitively increase and decrease when the control unit determines that the clutch is being operated in a partially engaged state for an excessive period of time.

22. The signaling device of claim 21, wherein the control unit includes logic rules effective for:

(a) sensing at least one vehicle operating condition;

(b) determining if the clutch is being operated in a partially engaged state; and (c) commanding the engine speed to repetitively increase and decrease a predetermined amount during operation of the clutch in a partially engaged state.

23. The control system according to claim 22, wherein the logic rules are additionally effective for, upon determining that the clutch is being operated in a partially engaged state, allowing the clutch to operate in a partially engaged state for a predetermined period of time.

24. The signaling device of claim 22, wherein the logic rules are additionally effective for increasing at least one of the amplitude and frequency of the first signal if after a predetermined amount of time the clutch continues to be operated in a partially engaged state.

25. The signaling device of claim 21, wherein the engine controller generates a second signal having at least one of amplitude and frequency that is increased over the first signal.

26. The signaling device of claim 21 further including an electronic data link, wherein the engine controller and control unit communicate over the electronic data link.

27. The signaling device of claim 21 wherein the first signal is the form of a sine wave having a predetermined amplitude and frequency.

28. A method for controlling a vehicular automated transmission system comprising an internal combustion engine having an engine flywheel, an engine controller having at least one mode of operation for controlling engine fueling to control at least the engine speed, a multiple speed transmission having an input shaft, a centrifugal friction clutch for drivingly connecting the engine flywheel to the input shaft, a throttle for requesting a degree of engine fueling, and a control unit for receiving input signals and processing the signals according to logic rules to issue command output signals to system actuators including at least the engine controller, the method comprising the steps of:

(a) sensing at least one vehicle operating condition;

(b) determining if the clutch is being operated in a partially engaged state; and (c) issuing a warning that the clutch is being operated in a partially engaged state.

29. The method according to claim 28, wherein the warning step comprises generating at least one of an audible tone and a flashing light.

30. The method according to claim 28, wherein the warning step comprises commanding the engine speed to repetitively increase and decrease a predetermined amount during operation of the clutch in a partially engaged state.

31. A method for controlling a vehicular automated transmission system comprising an internal combustion engine having an engine flywheel, an engine controller having at least one mode of operation for controlling engine fueling to control at least the engine speed, a multiple speed transmission having an input shaft, a centrifugal friction clutch for drivingly connecting the engine flywheel to the input shaft, a throttle for requesting a degree of engine fueling, and a control unit for receiving input signals and processing the signals according to logic rules to issue command output signals to system actuators including at least the engine controller, the method comprising the steps of:

(a) sensing the temperature of the clutch;

(b) determining if the clutch is being operated in a partially engaged state by comparing the sensed clutch temperature to a predetermined reference temperature; and (c) commanding the engine speed to repetitively increase and decrease a predetermined amount during operation of the clutch in a partially engaged state.

32. A method for controlling a vehicular automated transmission system comprising an internal combustion engine having an engine flywheel, an engine controller having at least one mode of operation for controlling engine fueling to control at least the engine speed, a multiple speed transmission having an input shaft, a centrifugal friction clutch for drivingly connecting the engine flywheel to the input shaft, a throttle for requesting a degree of engine fueling, and a control unit for receiving input signals and processing the signals according to logic rules to issue command output signals to system actuators including at least the engine controller, the method comprising the steps of:

(a) sensing at least one vehicle operating condition;

(b) determining if the clutch is being operated in a partially engaged state by estimating a clutch temperature from the at least one sensed vehicle operating condition and comparing the estimated clutch temperature to a reference clutch temperature; and (c) commanding the engine speed to repetitively increase and decrease a predetermined amount during operation of the clutch in a partially engaged state.

33. A method for controlling a vehicular automated transmission system comprising an internal combustion engine having an engine flywheel, an engine controller having at least one mode of operation for controlling engine fueling to control at least the engine speed, a multiple speed transmission having an input shaft, a centrifugal friction clutch for drivingly connecting the engine flywheel to the input shaft, a throttle for requesting a degree of engine fueling, and a control unit for receiving input signals and processing the signals according to logic rules to issue command output signals to system actuators including at least the engine controller, the method comprising the steps of:

(a) sensing at least one vehicle operating condition;

(b) determining if the clutch is being operated in a partially engaged state by determining a difference between energy input into the clutch and energy dissipated by the clutch and comparing the difference to a predetermined reference value; and (c) commanding the engine speed to repetitively increase and decrease a predetermined amount during operation of the clutch in a partially engaged state.

* * * * *